(12) United States Patent
Teslak et al.

(10) Patent No.: US 7,147,078 B2
(45) Date of Patent: Dec. 12, 2006

(54) CHARGING A FLUID ACCUMULATOR WHILE OPERATING A HYBRID VEHICLE POWERTRAIN INCLUDING AN ENGINE AND A PUMP/MOTOR

(75) Inventors: Chris Teslak, Plymouth, MI (US); Cliff Carlson, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 10/883,535

(22) Filed: Jul. 1, 2004

(65) Prior Publication Data

US 2006/0004509 A1 Jan. 5, 2006

(51) Int. Cl.
*G06F 17/00* (2006.01)
(52) U.S. Cl. ............... 180/305; 180/307; 180/367; 60/413
(58) Field of Classification Search ......... 180/305, 180/306, 307, 367, 165; 60/413, 414, 418
See application file for complete search history.

(56) References Cited

U.S. PATENT DOCUMENTS

| | | | | |
|---|---|---|---|---|
| 4,138,846 A | * | 2/1979 | Sakakibara | 60/435 |
| 4,348,863 A | * | 9/1982 | Taylor et al. | 60/327 |
| 4,351,409 A | * | 9/1982 | Malik | 180/165 |
| 5,337,629 A | * | 8/1994 | Kita | 477/52 |
| 5,495,912 A | | 3/1996 | Gray, Jr. et al. | |
| 5,505,527 A | | 4/1996 | Gray, Jr. et al. | |
| 6,070,408 A | * | 6/2000 | Clarke et al. | 60/415 |
| 6,085,520 A | * | 7/2000 | Kohno | 60/414 |
| 6,336,518 B1 | * | 1/2002 | Matsuyama | 180/306 |
| 7,076,946 B1 | * | 7/2006 | Swartzer et al. | 60/414 |
| 2003/0102179 A1 | * | 6/2003 | Achten | 180/306 |

FOREIGN PATENT DOCUMENTS

EP 0366080 2/1990

OTHER PUBLICATIONS

SAE Technical Paper Series 2002-01-3128, R.P. Kepner, Ford Motor Company, Hydraulic Power Assist—A Demonstration of Hydraulic Hybrid Vehicle Regenerative Braking in a Road Vehicle Application, Nov. 18-20, 2002, pp. 1-8.

* cited by examiner

*Primary Examiner*—Christopher P. Ellis
*Assistant Examiner*—Brian Swenson
(74) *Attorney, Agent, or Firm*—David B. Kelley; MacMillan Sobanski & Todd

(57) ABSTRACT

A system for replenishing a source of pressurized fluid for use in driving the wheels of a motor vehicle includes an accumulator containing fluid at relatively high pressure; a reservoir containing fluid at lower pressure; an engine driveably connected to the wheels and having a variable torque output; a pump/motor driveably connected to the wheels, including an inlet and an outlet, and having a variable volumetric displacement for pumping fluid between the accumulator and the reservoir; and a controller for determining a current cruise charge pressure limit for the accumulator, determining a desired magnitude of pump/motor torque with which to pump fluid to the accumulator, determining a desired magnitude of engine torque with which to drive the pump/motor at the desired magnitude of pump/motor torque, and controlling the engine to produce the desired magnitude of engine torque, to drive the pump/motor in a pumping mode at the desired magnitude of pump/motor torque, and to pump fluid to the accumulator from the reservoir.

12 Claims, 7 Drawing Sheets

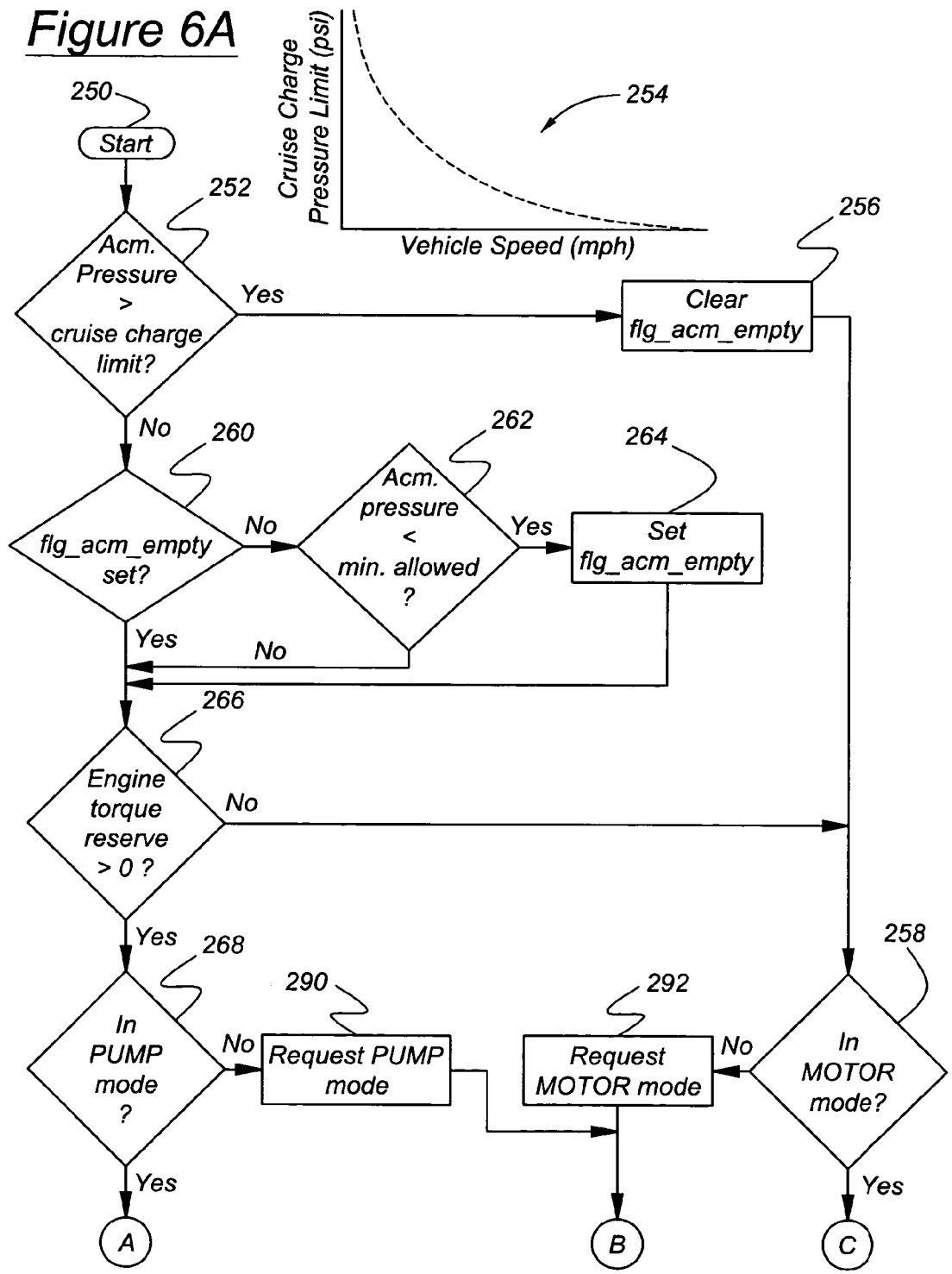

CHARGING A FLUID ACCUMULATOR WHILE OPERATING A HYBRID VEHICLE POWERTRAIN INCLUDING AN ENGINE AND A PUMP/MOTOR

BACKGROUND OF THE INVENTION

The invention relates to a hybrid vehicle powertrain that includes an engine and a pump/motor for pressurizing a fluid accumulator. More particularly, the invention pertains to using the engine and pump/motor during periods of relatively low power demand to maintain a charge of pressurized fluid in the accumulator for later use to accelerate the vehicle from a stopped or nearly stopped condition.

Hydraulic Power Assist (HPA) is a type of hydraulic hybrid vehicle, in which energy from regenerative braking or from an engine is stored in a hydro-pneumatic accumulator, and the conversion between mechanical power and hydraulic power is achieved through high pressure pump/motor, having a variable volumetric displacement. In an HPA system, using stored energy from regenerative braking to help accelerate the vehicle, reduces the burden on the engine and reduces fuel use.

Because of the high power density available with such hydraulic systems, it is possible to recover efficiently a significant portion of braking energy with an HPA system comprised of a single pump/motor and storage accumulators. With a 7000 lb. vehicle and a pump/motor whose maximum displacement is 150 cc., a HPA system can recover 72 percent of the available braking energy in the Environmental Protection Agency (EPA) city cycle. The pump/motor operates for long periods at higher displacements and with a relatively high cycle average efficiency of 88 percent. With a return of 56 percent of the braking energy to the drive wheels (72 percent recovered in braking, and 88 percent transfer efficiency in both pumping and motoring), it is possible to recover 56 percent of the vehicle kinetic energy (or 75 percent of the velocity) while accelerating, neglecting road load friction. In the EPA city cycle, it was possible to fill the hydraulic system when braking from 30 mph and then moderately accelerate again to about 22 mph using only stored energy from the HPA system.

U.S. Pat. No. 5,495,912 describes a hybrid powertrain in which engine output speed is controlled for optimum efficiency by adjustment of the input speed of a continuously variable transmission (CVT). Where power more than that provided by the engine is required, additional power is input to the drivetrain from a fluid motor driven by fluid pressure stored in an accumulator. When the engine produces power greater than that demanded of the vehicle, the fluid motor is reversed for operation as a pump and excess engine power is used to drive the pump and store energy in the accumulator in the form of fluid pressure. A controller determines power output required of the engine as a sum of that indicated by a sensor, which senses power demanded of the vehicle by a driver and an increment of power required to maintain the pressure of the accumulator above a threshold amount. An engine speed controller controls the rotary speed of the engine output to produce the required total power output, by changing the input speed of the CVT. In order to maintain optimum engine efficiency, memory containing maps correlating values for optimum engine speed with values for engine output power, are used to determine the optimum engine speed from the map by reference to the determined total requirement for engine output power. The invention also includes a method of operating the system in order to achieve the objective of optimum engine efficiency.

U.S. Pat. No. 5,505,527 describes a vehicle powertrain having regenerative braking that includes wheels and a brake pedal which, upon engagement, is activated first into a first zone of operation and then into a second zone of operation. A braking detector detects either a released state or an engaged state for the brake pedal and, if in the engaged state, detects if the pedal is in the first or the second zone of operation. Friction brakes brake a pair of the wheels, responsive to detection of the brake pedal within the second zone of operation. The hydraulic portion of the drivetrain includes an accumulator for storing hydraulic fluid under pressure, and a reservoir for storing the hydraulic fluid at a lower pressure. A pump/motor, located in the high pressure line, operates as a motor to drive the drive wheels in a drive mode and as a pump driven by the drive wheels in a braking mode. A prime mover, having its inlet connected to the reservoir through a low pressure line and its outlet connected to the accumulator through a high pressure line, hydraulically drives the pump/motor in its motor mode. A controller switches the pump/motor into the braking mode in responsive to detection of an engaged state for the brake pedal and into the drive mode in responsive to detection of the released state of the brake pedal. A switch valve connects the high pressure line to the accumulator in the braking mode and to the reservoir in the drive mode.

A principal purpose of a hybrid powertrain having two power sources, an internal combustion engine, and high-pressure source of pneumatic or hydraulic fluid, is an increase in fuel economy compared to conventional powertrains having only an engine. The kinetic energy of the vehicle provides a replenishable source of energy that can be readily produced by the engine and motor/pump, and stored as high pressure fluid for use in accelerating the vehicle. The engine can be used to pump fluid to a high pressure accumulator from a low pressure reservoir when engine output power is available for this purpose and fuel economy permits.

There is a need, however, for a system and method continuously to replenish a source of pressurized fluid for use in driving the wheels of the vehicle. The fluid pressure source should be charged with fluid when vehicle power demand is low so that there is available stored energy when needed to accelerate the vehicle. Reserve engine torque capacity can be used to ensure a sufficient fluid volume and pressure in the fluid pressure source in order to produce predictable, consistent vehicle launches using the stored fluid to drive the wheels of the vehicle.

SUMMARY OF THE INVENTION

The system and method of this invention provides a full accumulator when the vehicle comes to a stop so that when a launch is demanded by the driver, the vehicle performs consistently with all previous launches. This must occur regardless of the rate of vehicle acceleration. In situations that offer little or no opportunity to charge the accumulator, such as during a rapid acceleration from a stop followed by a very rapid deceleration to a stop, little can be done to replenish the pressurized fluid source. However, during steady-speed vehicle travel, there is an opportunity to employ at least a portion of reserve engine power producing capacity for this purpose. After a brief period of steady-speed travel with a torque converter locked, the accelerator pedal steady and depressed, a cruise charge control method can be initiated.

A method according to this invention is preferably for use in a powertrain for a motor vehicle having an engine driveably connected to the wheels, a pump/motor driveably connected to the wheels and engine, and a accumulator for storing and releasing fluid. The method replenishes a charge of pressurized fluid in the accumulator by determining a current cruise charge pressure limit for the accumulator, determining a desired magnitude of pump/motor torque with which to pump fluid to the accumulator, determining a desired magnitude of engine torque with which to drive the pump/motor at the desired magnitude of pump/motor torque, and using the engine to produce the desired magnitude of engine torque, to drive the pump/motor in a pumping mode at the desired magnitude of pump/motor torque, and to pump fluid to the accumulator.

A system for replenishing a source of pressurized fluid for use in driving the wheels of a motor vehicle includes an accumulator containing fluid at relatively high pressure; a reservoir containing fluid at lower pressure; an engine driveably connected to the wheels and having a variable torque output; a pump/motor driveably connected to the wheels, including an inlet and an outlet, and having a variable volumetric displacement for pumping fluid between the accumulator and the reservoir; and a controller for determining a current cruise charge pressure limit for the accumulator, determining a desired magnitude of pump/motor torque with which to pump fluid to the accumulator, determining a desired magnitude of engine torque with which to drive the pump/motor at the desired magnitude of pump/motor torque, and controlling the engine to produce the desired magnitude of engine torque, to drive the pump/motor in a pumping mode at the desired magnitude of pump/motor torque, and to pump fluid to the accumulator from the reservoir.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
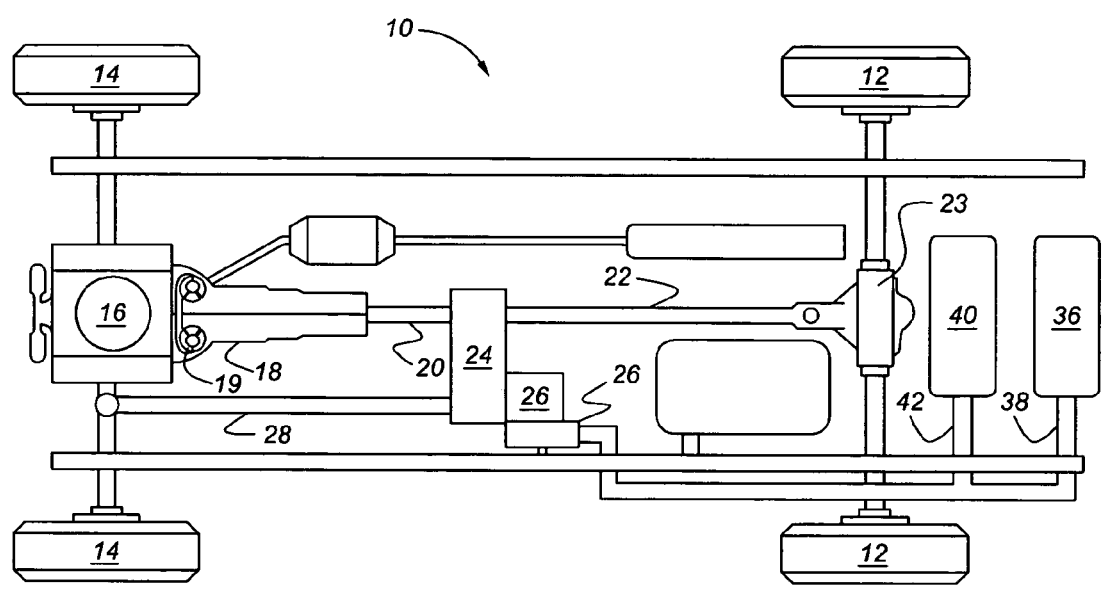
FIG. 1 is a schematic diagram of a powertrain for a hydraulic hybrid motor vehicle that operates in a brake regenerative mode and power assist mode.

Referring now to the drawings, there is illustrated in FIG. 1 a hydraulic hybrid powertrain 10 for driving the rear wheels 12 and front wheels 14 of a motor vehicle. A power source 16, such as an internal combustion engine, is driveably connected to a transmission 18, preferably an automatic transmission that produces multiple ratios of the speed of its input shaft and the speed of its output shaft 20. An automatic transmission includes a torque converter 19, which increases the torque output of the engine during vehicle acceleration to a higher torque, which is transmitted to the transmission input shaft ahead of the gearing. Suitable alternative transmissions include those that are manually operated, and those that produce continuously variable speed ratios or infinitely variable speed ratios, having chain drive, belt drive or traction drive mechanisms. The transmission output shaft 20 is continually driveably connected to the rear wheels 12 through a rear driveshaft 22, rear axle shafts, and a rear differential mechanism 23, which produces an additional speed reduction and has a drive ratio. A transfer case 24 selectively transfers a portion of the torque carried by output shaft 20 to a front driveshaft 28, which is driveably connected to the front wheels 14 through a front differential mechanism and front axle shafts. The vehicle, therefore, can operate in all-wheel drive or four-wheel drive modes.

A hydraulic pump/motor 26 having a variable volumetric displacement is continually driveably connected to the transmission output shaft 20 and to the rear driveshaft 22. When torque is transmitted in a positive torque directional sense, i.e., from the engine to the wheels, the engine 16 drives the pump/motor 26 through the transmission 18 and output shaft 20, and the rear wheels 12 through the driveshaft 22. When torque is transmitted in the negative torque direction, from the wheels to the engine, the rear wheels 12 drive the pump/motor 26 through rear driveshaft 22 and the transfer case 24. A dog clutch located in the transfer case 24 produces a releasable drive connection between the pump/motor 26 and the front driveshaft 28. A reservoir 36 containing hydraulic or pneumatic fluid at relative low pressure is connected through check valves and fluid lines 38 to the pump motor 26, as described with reference to FIG. 3. Similarly, an accumulator 40 containing hydraulic or pneumatic fluid at relative high pressure is connected through check valves and fluid lines 42 to the pump motor 26.

While accelerating the vehicle with hydraulic power assist, high pressure fluid in accumulator 40 drives the pump/motor 26, and the wheels 12, 14 are driven in rotation by the pump/motor, which operates then as a fluid motor. During operation in the brake regeneration mode, the vehicle is decelerated at least partially by recovering vehicle kinetic energy in the form of pressurized hydraulic fluid contained in accumulator 40. In the brake regeneration mode, the pump/motor 26 pumps fluid from reservoir 36 to the accumulator 40. The wheels 12 drive the pump/motor 26 through the rear axle and driveshaft 22, and the pump/motor 26 pumps fluid from reservoir 36 across a pressure differential between the pump inlet, which communicates with reservoir 36, and the pump outlet, which communicates with accumulator 40. Fluid entering the accumulator 40 compresses nitrogen contained in a bladder in the accumulator 40, and the accumulator is pressurized.

Figure 2:
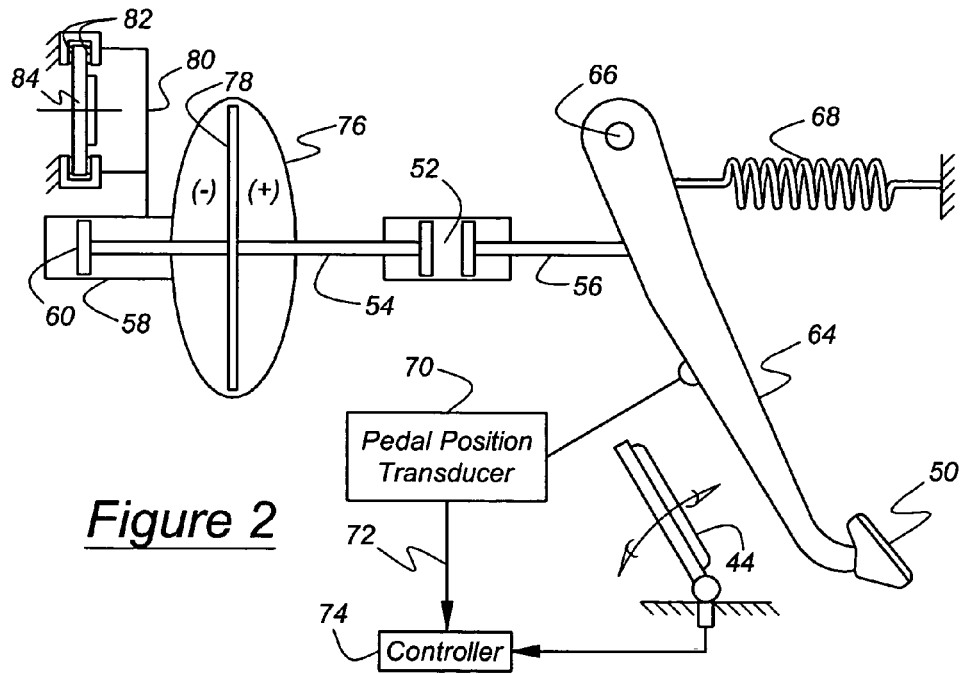
FIG. 2 is a schematic diagram of a brake pedal for use in controlling the brake regeneration mode of the powertrain of FIG. 1.

Referring now to FIG. 2, in a conventional vehicle when the foot brake pedal 50 is applied, the vehicle decelerates due to friction braking, i.e., frictional contact of brake pads or brake shoes on wheel brake rotors or drums. The kinetic energy of the vehicle is converted by this frictional contact to heat, which is dissipated. In a deadband parallel regenerative braking system, a space 52 is located between connecting rods 54, 56, which connect a brake master cylinder 58 and the foot brake pedal 50. The space 52 causes the brake pedal to move from the rest position, shown in FIG. 2, through a first portion of its full displacement before hydraulic brake pressure is generated in the master cylinder due to movement of the piston 60 within the master cylinder 58. This delays the application of the wheel friction brakes as the pedal is being displaced. The range of brake pedal displacement in which no friction braking occurs, called the "deadband" region, is preferably about 30 percent of the full range brake pedal displacement beginning when the brake pedal is at rest and not displaced.

A tension spring 68, fastened to a brake lever 64 between the fulcrum 66 and the pedal 50, provides a force sensed by the vehicle operator and resisting brake pedal displacement in the deadband range. The force of spring 68, produced when depressing the brake pedal 50, compensates for the absence of a hydraulic pressure force opposing pedal displacement and piston movement in the master cylinder while the pedal is in the deadband range. A power brake canister 76 contains a piston 78, which is actuated by engine vacuum to increase the force applied to connecting rod 54 by depressing the brake pedal 50.

A brake pedal position transducer 70 produces an electronic signal 72 as input to controller 74 representing the position of the brake pedal 50. Controller 74 operates under control of a microprocessor, which executes programmed control logic for controlling the hydraulic system of FIG. 3 and the vehicle powertrain. The controller 74 receives input signals produced by other sensors representing fluid pressure at various places in the hydraulic system, volumetric displacement of the pump/motor, the magnitude of a variable swashplate angle that alters the displacement of the pump/motor, displacement of the accelerator pedal 44 and brake pedal 64, and various inputs produced by the vehicle operator and powertrain system inputs. The controller 74 issues command signals, received by solenoid-operated hydraulic control valves of the hydraulic system causing the valves to produce various system operating states and transitions among those states.

Pressure in the hydraulic brake system 80, which actuates the friction brakes 82, changes as pressure in the master cylinder 58 changes due to displacement of piston 60 in the cylinder as the brake pedal 50 is depressed and released. When the brake pedal 50 is depressed beyond the deadband range sufficiently to close the space 52, brake system pressure forces the brake pads 82 into frictional contact with the brake disc 84, to which a wheel 12 is fixed.

In addition to the friction brakes, the vehicle is braked also by a regenerative brake system. While the brake pedal 50 is depressed, the operating states of hydraulic pump/motor 26 are changed between a pump state and motor state in response to command signals produced by controller 74.

Figure 3:
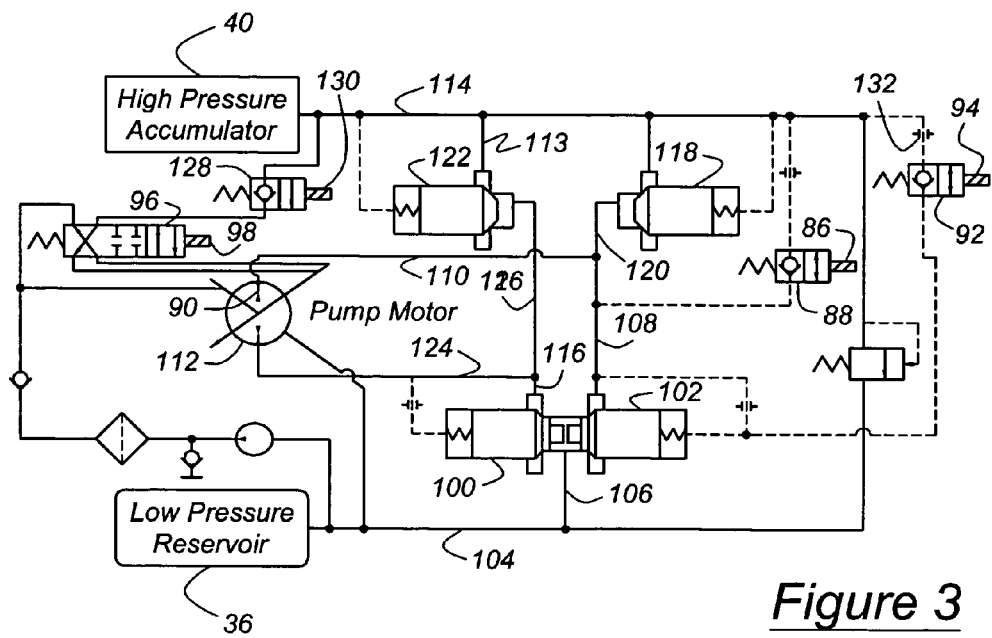
FIG. 3 is a schematic diagram of a hydraulic system for the vehicle showing the pump/motor, accumulator, reservoir, control valves and hydraulic lines connecting them.

The mode valve 88 is switched between the closed state shown in FIG. 3 and an open state by a solenoid 86 in response to command signals from controller 74. A low flow rate valve 92 is switched between the closed state shown in FIG. 3 and an open state by a solenoid 94 in response to command signals produced by controller 74.

Preferably the pump/motor 26 is a bent-axis variable displacement unit whose maximum displacement is 150 cc per revolution, and available commercially from Ifield Technology, Inc. At peak pressure of about 5000 psi., the pump/motor produces approximately 600 ft-lb of braking torque in the pumping mode or acceleration torque in the motoring mode to the driveshaft 22. Changing the angular disposition of a swashplate varies displacement of the pump/motor. System fluids in a pressure range 2500–5000 psi. is used to control the swashplate angle. A PID control system continually produces a command signal tending to minimize the difference between the current swashplate angle and the angle corresponding to the desired magnitude of torque produced by the pump/motor 26.

A four-way swashplate control valve 96, also called a proportional valve, changes the variable displacement of the pump/motor 26 in response to commands issued by controller 74. Solenoid 98 changes the state of valve 96 among three states, a center position where the inlet and outlet of valve 96 are mutually disconnected, a left-hand position where the angular disposition of the swashplate and displacement of the pump/motor 26 decrease, and a right-hand position where the swashplate angle and displacement of the pump/motor 26 increase. Proportional valve 96 is switched between its states by a solenoid 98 in response to command signals from controller 74.

Poppet valves 100, 102 move rightward from the position of FIG. 3 to open a hydraulic connection between reservoir 36 and the inlet 90 of the pump/motor 26 through lines 104, 106, 108, 110. Poppet valves 100, 102 move leftward from the position of FIG. 3 to open a hydraulic connection between the outlet 112 of the pump/motor 26 and reservoir 36 through lines 124, 116, 106, 104. Poppet valve 118 moves rightward from the position of FIG. 3 to open a hydraulic connection between accumulator 40 and the inlet 90 of the pump/motor 26 through lines 114, 120 and 110. Poppet valve 122 moves leftward from the position of FIG. 3 to open a hydraulic connection between outlet 112 of the pump/motor 26 and accumulator 40 through lines 124, 126, 113 and 114. Poppet valves 118 and 122 are closed in the positions shown in FIG. 3.

An isolation valve 128, controlled by solenoid 130 in response to command signals from controller 74, alternately opens and closes a connection between accumulator 40 and an inlet of valve 96.

In operation, to place the hydraulic system in the pumping operation mode, isolation valve 128 opens a connection from accumulator 40 to the proportional valve 96, which is moved to the right-hand state, where variable force solenoid 98 is prepared to increase displacement of the pump/motor 26 by increasing the swashplate angle. Poppet check valves 100, 102 are moved rightward to connect reservoir 36 to the inlet port 90 of the pump/motor 26 through hydraulic lines 104, 106, 108 and 110. Check valve 118 closes line 120 from the accumulator 40, but check valve 122 opens line 126 to the accumulator 40 through line 114 when pump/motor 26 starts turning and pressure at the pump outlet 112 exceeds pressure in the accumulator 40. These steps complete a hydraulic circuit from the reservoir 36 to and through the pump/motor 26, and from pump/motor to the accumulator 40. Preferably the control signal applied to solenoid 98 is an electric current in the range 0–2 amps. The swashplate angle and displacement of the pump/motor 26 changes in proportion to the magnitude of the current signal at solenoid 98.

Pump displacement is directly related to the torque necessary to rotate the pump rotor at a given hydraulic pressure. When the brake pedal 50 is in the deadband range, the system operates in the pump mode, and vehicle braking is entirely accomplished by the pump 26. If the brake pedal is displaced past the deadband range, vehicle braking is accomplished by a combination by regenerative braking and friction braking in the correct proportion to achieve the vehicle deceleration rate desired by the vehicle operator.

Before switching the hydraulic system from pumping operation mode to the motoring mode, the proportional valve 96 first causes the pump/motor displacement to be zero so that cavitation of the pump/motor is prevented during the transition. Proportional control is also prevented, i.e., if the controller determines that a positive swash angle is desired in order to meet powertrain system requirements, the controller nonetheless maintains pump/motor displacement at zero until the transition of the system to the motoring mode is completed. Isolation valve 128 is closed upon a command from controller 74 to its actuating solenoid 130. Then the low flow rate valve 92 is opened, which forces poppet check valves 100, 102 leftward, thereby closing line 106 from line 108, and opening line 116 to reservoir 36 through lines 104 and 106. This opens a hydraulic connection between reservoir 36 and the pump/motor outlet 112. With the hydraulic system so disposed, the accumulator is connected through line 114, restriction orifice 132, valve 92 and lines 108, 110 to the inlet 90. The low flow rate valve 92 is opened for a period of about 200 ms until the system is pressurized sufficiently by accumulator 40. Controller 74 includes a countdown timer, which expires in about 200 ms. after the transition to pumping mode begins.

Then when the timer expires, the low flow rate valve 92 closes and the mode valve 88 opens to the accumulator pressure, which moves poppet check valve 118 rightward, thereby opening a high flow rate connection between accumulator 40 and the pump/motor inlet 90 through line 114, valve 118, and lines 108, 110. These steps complete the transition to the motoring mode. Thereafter, controller 74 permits proportional control, and the pump/motor displacement follows input from the accelerator pedal representing desired wheel torque increases and decreases.

Figure 4:
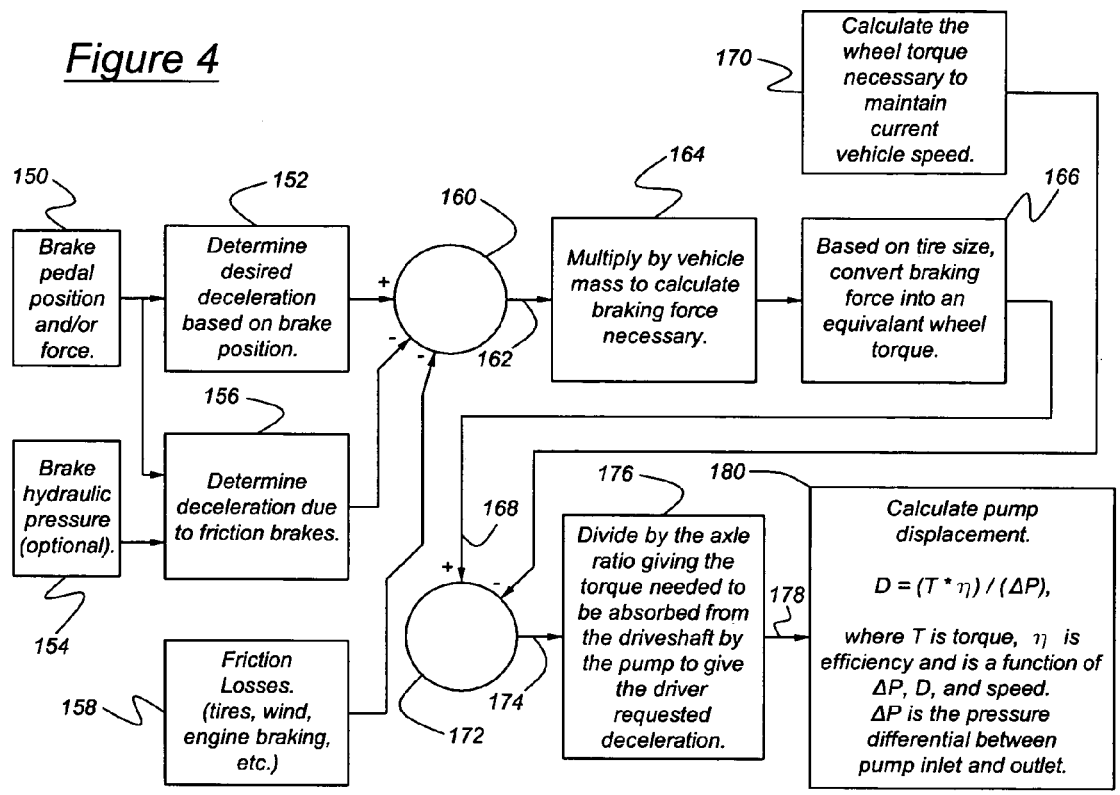
FIG. 4 is a diagram of logic for controlling brake regeneration in response to the brake pedal position.

Referring now to FIG. 4, after the vehicle operator depresses the brake pedal, to the extent to which the brake pedal is depressed 150, called "brake pedal position," is used to determine the current desired vehicle deceleration rate 152. Brake system hydraulic pressure 154 at the wheel brakes is used with the brake pedal position 150 to determine the corresponding vehicle deceleration rate due to applying the friction brakes 156. Parasitic drag on the vehicle 158 due to tire friction and air friction, and the effects of engine braking are used to determine vehicle deceleration due to these factors. The vehicle deceleration rates 152, 156, 158 are added algebraically at summing junction 160 to produce a net vehicle deceleration rate 162.

At 164, the vehicle mass is multiplied by the net vehicle deceleration rate 162 to produce the magnitude of force, which if applied to the vehicle, would produce the net vehicle deceleration rate 162.

That force is converted at 166 to an equivalent wheel torque 168 using the tire size and a nominal coefficient of friction between the tires and the road surface. At 170, the wheel torque required to maintain the current vehicle speed is calculated. At summing junction 172, the magnitude of the difference between torques 168 and 170 is calculated to determine the change in wheel torque 174 necessary to stop the vehicle from the current speed at the desired deceleration rate 152.

At 176, that differential torque 174 is divided by the axle ratio to determine the magnitude of torque 178 that must be deducted from the torque transmitted by the driveshaft 28 to the pump/motor 26 in order to produce the desired vehicle deceleration rate 152. Then at 180, the pump displacement corresponding to torque 178 is calculated. The controller 74 produces a command signal that is transmitted to solenoid 98 of the a proportional valve 96 in order to change the angular position of the swashplate and to change the displacement of the pump/motor 26 to the pump displacement calculated at 180.

The brake hold control uses the hydraulic drive system for braking a stopped vehicle against creeping while automatic transmission 18 is in gear despite there being little or no vehicle kinetic energy to recover by regenerative braking. The brake hold control determines whether (1) the transmission 18 is in gear, i.e., whether a gear selector controlled by the vehicle operator is a drive range, (2) the brake pedal 50 is depressed, and (3) the vehicle is stopped or has a speed that is equal to or less than a low reference speed. The position of the gear selector is controlled by the vehicle operation by moving a selector among forward drive, park, neutral and reverse drive ranges, called PRNDL positions.

If these conditions are true, and provided an accelerator pedal 44 is not depressed, the brake hold control is activated. Mode valve 88 is placed in the pump position by solenoid 86 in response to a control signal from controller 74. Isolation valve 128 is energized by solenoid 130, thereby connecting the accumulator 40 to the inlet of swashplate control valve 96, so that displacement of the pump motor 26 can be increased, preferably linearly, to its maximum displacement, through operation of solenoid 98 in response to commands from controller 74. Displacement of the pump/motor 26 is increased such that the magnitude of negative torque transmitted to the wheels 12 by the pump/motor 26 is greater than the magnitude of positive torque transmitted from the engine through the transmission 18 and its torque converter to the wheels 12. In this way the vehicle wheels 12 are braked sufficiently so that the vehicle will not creep due to the effect of the idling engine transmitting torque to the wheels through the torque converter of the automatic transmission. This control requires minimal brake pedal effort to keep the vehicle stopped in an idling condition.

Controller 74 determines the magnitude of torque produced by the engine on the basis of engine speed, engine throttle position, mass airflow and other pertinent engine parameters. The transmission gear ratio and axle ratio are then used to determine by calculation the torque transmitted to the wheels by the idling engine. That torque is comparable to the torque 170 of FIG. 4. The displacement of the pump/motor 26 that will produce enough negative torque at the wheels to react to the idle torque is determined as described with reference to step 178. Then the controller produces a command signal that is transmitted to solenoid 98 of the a proportional valve 96 to change the angular position of the swashplate and the displacement of the pump/motor 26 to a displacement slightly greater than the pump displacement calculated at 128.

Figure 5A:
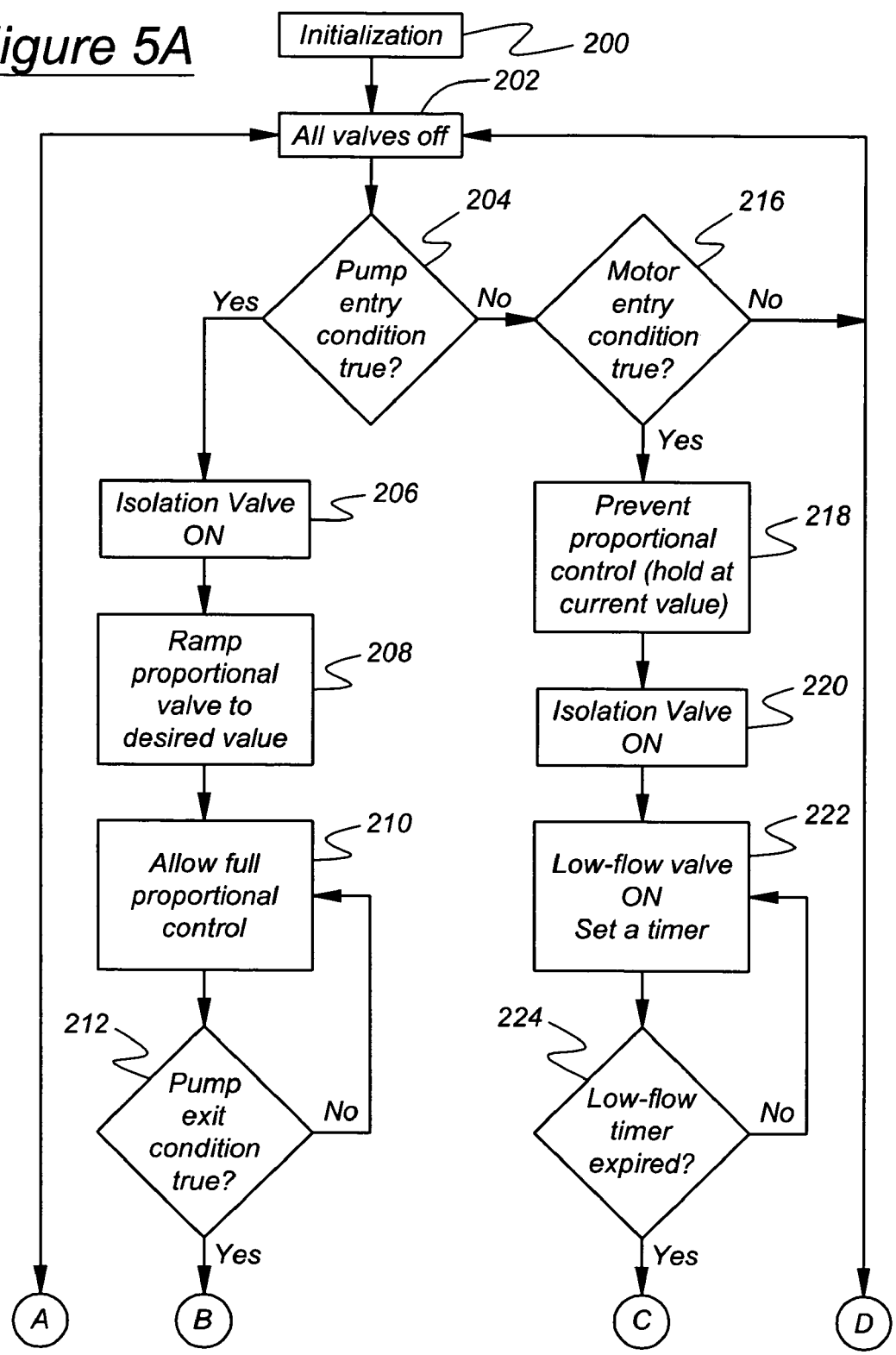
FIGS. 5A and 5B are a mode control logic diagram for controlling the hydraulic system of FIG. 3.
Figure 5B:
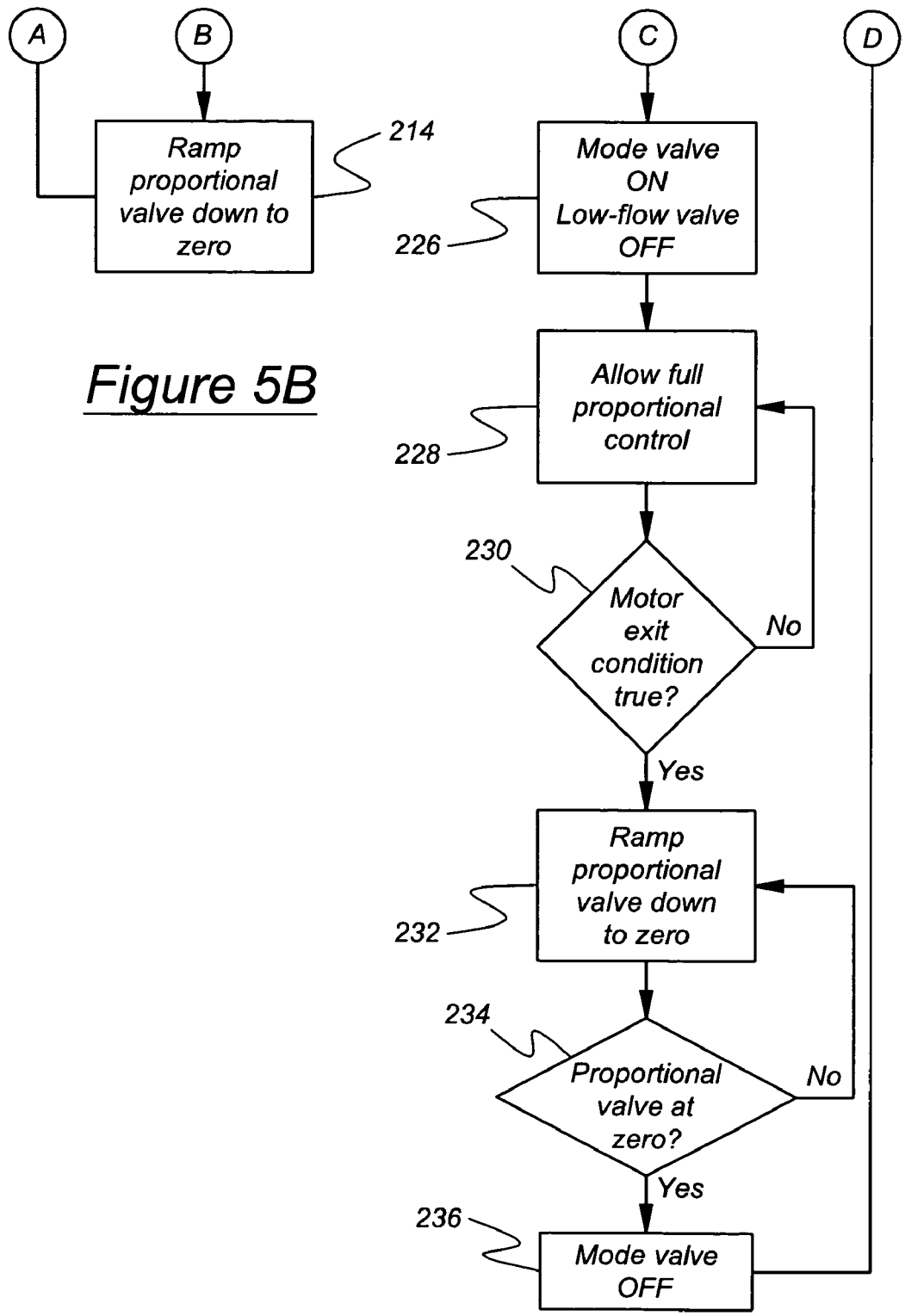

Referring to FIG. 5, after being initialized at 200, the control executed by controller 74 first checks at 202 whether the poppet, flow, mode, isolation and proportional valves are closed. Then at 204 a check is made to determine whether the pump mode entry conditions are met. The pump mode is entered if the controller determines a need for increased torque, vehicle speed is less than about 30–40 mph, pressure in accumulator is less than a predetermined magnitude, and other similar powertrain system conditions. If those conditions are logically true, a 206 isolation valve 128 is placed in its ON state by the controller 74 issuing a command signal to its actuating solenoid 130. The proportional valve 96 is ramped to its desired displacement magnitude by changing the magnitude of current supplied to solenoid 98 at step 208 and full proportional control is initiated at 210. When the pump mode exit conditions are present, at 212 the proportional valve 96 is ramped down to produce zero pump/motor displacement and torque at 214. The pumping mode exit conditions are essentially the opposite of the corresponding entry conditions.

If the pump entry conditions are logically false, a check is made at 216 to determine whether the motor entry conditions are logically true. If so, proportional control is prevented at 218, the isolation valve 128 is placed in its ON state at 220 by issuing a command signal to its actuating solenoid 130, the low flow valve 92 is placed in its ON state at 222, and low flow timer is set. The motoring mode entry conditions include a powertrain condition for which torque produced by the pump/motor is desired to drive the vehicle wheels, the presence of a sufficient magnitude of fluid pressure and volume in the accumulator, vehicle speed in a range 0–30 mph, and additional powertrain system conditions. A check is made at 224 to determine whether the low flow timer has expired. If so, at 226, the mode valve 88 is placed in its ON state, and low flow valve 92 is turned OFF. Next at 228, full proportional control is enabled. A check is made at 230 to determine whether the motor exit conditions are logically true. If so, at 232 the proportional valve 96 begins to ramp motor displacement and torque output by the pump/motor 26 down to zero. When the proportional valve has completed the linear decease of pump/motor displacement to zero, as indicated by a positive test at 234, at 236 the mode valve 88 is closed at 236.

Figure 6B:
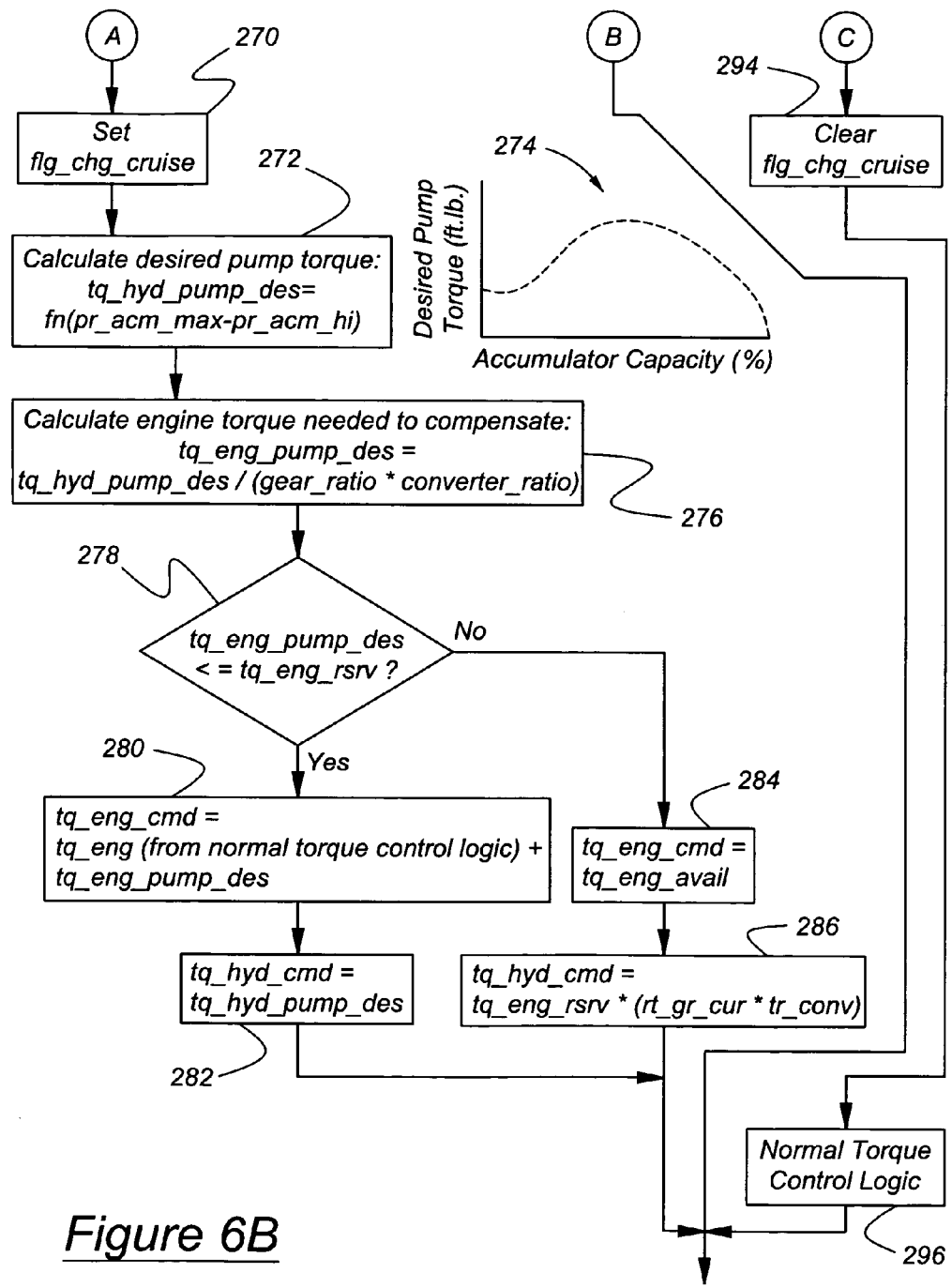
FIG. 6 is a diagram of logic for controlling torque produced by an engine and a fluid motor of a hybrid vehicle powertrain.

FIG. 6 is a diagram of a procedure, called cruise charging, in which the engine 16 and pump/motor 26 are used during periods of relatively low power demand to maintain a charge of pressurized fluid in the accumulator 40 for later use to accelerate the vehicle from a stopped or nearly stopped condition. The controller 74 begins at 250 to execute the cruise charging procedure control method when the following entry conditions are met: operating for a short period at steady vehicle speed, the bypass clutch of the torque converter 19 is locked, and the position of the accelerator pedal 44 is depressed and steady. When the bypass clutch is locked, the transmission-input shaft 20 is mechanically connected to the engine shaft, and no speed reduction or torque amplification is produced between the impeller input and turbine output of the torque converter.

The first check is made at 252 to determine whether the pressure in accumulator 40 is greater than a cruise charge limit pressure corresponding to the current vehicle speed. FIG. 6 shows at 254 the variation of cruise charge limit pressure with vehicle speed. The cruise charge pressure limit provides sufficient volumetric fluid capacity in the accumulator to contain the fluid that is pumped by the pump/motor 26 from the reservoir 36 during a deceleration energy recovery or brake regeneration event. If the result of step 252 is logically true, at 256 a flag indicating the accumulator is empty is cleared, and control passes to 258. If the result of step 252 is logically false, a check is made at 260 to determine whether the accumulator empty flag is set. If that flag is not set, a check is made at 262 to determine whether accumulator pressure is less than a minimum allowed pressure, and the accumulator empty flag is set at 264, if the result of step 262 is logically true. The minimum allowed pressure is the pressure that corresponds to an empty accumulator.

The next check at 266 determines whether the engine currently has reserve torque producing capacity. If not, control passes to 258. Engine reserve torque capacity is known because the engine is being currently controlled to generate a known portion of its maximum torque capacity in order to meet driver and vehicle requirements. If engine reserve torque capacity exists and cruise charging is both required and possible, at 268 the controller 74 operates the hydraulic system and pump/motor 26 in the pumping mode, and sets a flag at 270 indicating charge cruising control is underway.

At 272, the desired pump torque is calculated as a function of the difference in pressure between the maximum accumulator pressure (a predetermined constant) and the current accumulator pressure or determined by the controller 74 from a lookup table indexed by that pressure difference. FIG. 6 shows at 274 the variation of desired pump torque with accumulator reserve capacity. The displacement of the pump is determined from the magnitude of torque that can be transmitted to the pump motor from the powertrain and driveline without creating a driveline disturbance and without exceeding the accumulator charge rate limits set by the physical parameters of the hydraulic system.

After the desired pump torque has been established, the pump displacement is calculated, and controller 74 issues command signals to solenoid 98, which responds to the command signals by adjusting the swashplate angle to produce and maintain the desired pump displacement via closed-loop PID control. At 276, the magnitude of torque that the engine must produce in order to drive the pump/motor 26 at the desired torque is calculated by dividing the desired pump/motor torque by the product of the current transmission gear ratio and the torque converter ratio. At 278 a check is made to determine whether the desired engine torque is equal to or less than the reserve engine torque. If the desired engine torque is less than engine reserve torque, the controller 74 issues a command at 280 for the engine to increase current engine torque by the magnitude of engine desired torque, and a command at 282 for the pump/motor to produce the desired pump torque. If the check at 278 indicates that the engine has insufficient reserve torque capacity to produce the engine desired torque, at 284 the controller 74 issues a command for the engine to produce its maximum available torque, and a command at 286 for the pump/motor to produce torque at the engine crankshaft equal to the engine reserve torque capacity. Engine torque can be controlled by manipulating any of various engine parameters including, engine airflow, the throttle position of the engine, ignition timing, and engine air-fuel ratio.

In this way, if the engine reserve torque is greater than zero, but not enough to completely compensate for all the pump torque, the engine is operated at the maximum allowed portion of reserve torque and the pump torque is reduced accordingly. Preferably, the commanded engine torque does not require opening the torque converter bypass clutch.

If at step 268 the control is not in the pumping mode, at 290 the pumping mode is commanded by the controller 74 and the cruise charging routine of FIG. 6 is exited. If at step 258 the control is not in the motoring mode, at 292 the motoring mode is commanded by the controller 74 and the cruise charging routine of FIG. 6 is exited. If at step 258 the control is in the motoring mode, at step 294 the cruise charging flag is cleared, and at 296 the control exits the cruise control routine and returns to normal engine and pump/motor control.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. In a powertrain for a motor vehicle having an engine driveably connected to the wheels, a pump/motor driveably connected to the wheels and engine, and a accumulator for storing and releasing fluid, a method for replenishing a charge of pressurized fluid in the accumulator, the method comprising the steps of:
   determining a current fluid volume and pressure in the accumulator;
   determining a fluid volume that would be pumped to the accumulator if a brake regeneration event were to occur at a current speed of the vehicle;

determining a prospeptive accumulator pressure that would result due to said brake regeneration event and the current fluid volume and pressure in the accumulator;

determining a maximum allowable accumulator preasure;

setting a current cruise charge measure limit equal to a difference between the maximum allowable accumulator pressure and said prospective accumulator pressure;

determining a desired magnitude of pump/motor torque with which to pump fluid to the accumulator;

determining a desired magnitude of engine torque with which to drive the pump/motor at the desired magnitude of pump/motor torque; and using the engine to produce the desired magnitude of engine torque, to drive the pump/motor in a pumping mode at the desired magnitude of pump/motor torque, and to pump fluid to the accumulator.

2. The method of claim 1, further comprising:

changing an engine parameter such that the engine produces the desired magnitude of engine torque.

3. The method of claim 1, wherein the step of determining a desired magnitude of pump/motor torque with which to pump fluid to the accumulator further comprises:

determining a current magnitude of pressure differential between an inlet and an outlet of the pump/motor;

determining a desired displacement of the pump/motor for pumping fluid to the accumulator; and using the desired displacement of the pump/motor and the current magnitude of pressure differential to determine the desired magnitude of pump/motor torque with which to pump fluid to the accumulator.

4. The method of claim 1, wherein the step of determining a desired magnitude of pump/motor torque with which to pump fluid to the accumulator further comprises:

determining a current magnitude of pressure differential between an inlet and an outlet of the pump/motor;

determining a desired rate of fluid flow to the accumulator;

determining a desired displacement of the pump/motor for pumping fluid at the desired fluid flow rate to the accumulator; and using the desired displacement of the pump/motor and the current magnitude of pressure differential to determine the magnitude of pump/motor torque with which to pump fluid to the accumulator.

5. The method of claim 1, wherein the step of using the engine to drive the pump/motor further comprises:

determining whetter the cngine has a current magnitude of reserve engine torque producing capacity;

determining from the magnitude of engine torque required to transmit to the pump/motor said desired magnitude of pump/motor torque; and increasing a current magnitude of engine torque by a torque magnitude that is equal to or less than the lesser of the current magnitude of reserve engine torque producing capacity and the desired magnitude of engine torque required to transmit said desired magnitude of pump/motor torque to the pump/motor.

6. The method of claim 1, further comprising:

adjusting an engine operating parameter to control the engine torque and to drive the pump/motor in a pumping mode at the desired magnitude of pump/motor torque.

7. The method of claim 6 wherein said engine operating parameter is a member of the group consisting of a throttle position of the engine, a rate of engine airflow, an engine ignition timing, an engine air-fuel ratio, and an engine fuel flow.

8. The method of claim 1, further comprising:

determining based on a current speed of the vehicle that a current accumulator pressure is less than the current cruise charge pressure limit.

9. A system for replenishing a source of pressurized fluid for use in driving the wheels of a motor vehicle comprising:

an accumulator containing fluid at relatively high pressure;

a reservoir containing fluid at lower pressure;

an engine driveably connected to the wheels and having a variable torque output;

a pump/motor driveably connected to the wheels, including an inlet and an outlet, and having a variable volumetric displacement for pumping fluid between the accumulator and the reservoir;

a controller for determining a current cruise charge pressure limit for the accumulator, determining a desired magnitude of pump/motor torque with which to pump fluid to the accumulator, determining a desired magnitude of engine torque with which to drive the pump/motor at the desired magnitude of pump/motor torque, and controlling the eugine to produce the desired magnitude of engine torque, to drive the pump/motor in a pumping mode at the desired magnitude of pump/motor torque, to pump fluid to the accumulator from the reservoir;

determining a current fluid volume and pressure in the accumulator;

determining a fluid volume that would be pumped to the accumulator if a brake regenention event were to occur at a current speed of the vehicle;

determining a prospective accumulator pressure that would result due said brake regeneration event and the current fluid volume and pressure in the accumulator;

determining a maximum allowable accumulator pressure; and setting the current cruise charge pressure limit equal to a differene between the maximum allowable accumulator pressure and said prospective accumulator pressure.

10. The system of claim 9 wherein the controller further:

determines a current magnitude of pressure differential between an inlet and an outlet of the pump/motor;

determines a desired displacement of the pump/motor for pumping fluid to the accumulator; and determines the desired displacement of the pump/motor and the current magnitude of pressure differential the desired magnitude of pump/motor torque with which to pump fluid to the accumulator from the reservoir.

11. The system of claim 9 wherein the controller further:

determines a current magnitude of pressure differential between an inlet and an outlet of the pump/motor;

determines a desired rate of fluid flow to the accumulator;

determines a desired displacement of the pump/motor for pumping fluid at the desired fluid flow rate to the accumulator; and determines, from desired displacement of the pump/motor and the current magnitude of pressure differential, the magnitude of pump/motor torque with which to pump fluid to the accumulator.

12. The system of claim 9 wherein the controller further:

determines whether the engine has a current magnitude of reserve engine torque producing capacity;

determines from the magnitude of engine torque required to transmit to the pump/motor said desired magnitude of pump/motor torque; and increases a current magnitude of engine torque by a torque magnitude that is equal to or less than the lesser of the current magnitude of reserve engine torque producing capacity and the desired magnitude of engine torque required to transmit said desired magnitude of pump/motor torque to the pump/motor.

* * * * *